United States Patent
Borgstadt

(10) Patent No.: US 7,917,322 B2
(45) Date of Patent: Mar. 29, 2011

(54) WEIGHT OBSERVER FOR MASS METERING AND INVENTORY MANAGEMENT

(75) Inventor: Justin Borgstadt, Duncan, OK (US)

(73) Assignee: Halliburton Energy Services Inc., Duncan, OK (US)

( * ) Notice: Subject to any disclaimer, the term of this patent is extended or adjusted under 35 U.S.C. 154(b) by 250 days.

(21) Appl. No.: 12/044,251

(22) Filed: Mar. 7, 2008

(65) Prior Publication Data
US 2009/0228220 A1 Sep. 10, 2009

(51) Int. Cl.
*G01F 23/00* (2006.01)

(52) U.S. Cl. .......... 702/101; 702/100; 702/55; 324/306; 73/1.01; 73/1.16; 73/1.57

(58) Field of Classification Search .................. 702/101, 702/55, 100; 324/306; 73/1.01–1.02, 1.16, 73/1.57
See application file for complete search history.

(56) References Cited

U.S. PATENT DOCUMENTS

| | | | |
|---|---|---|---|
| 7,308,379 B2 | 12/2007 | Dykstra et al. | 702/127 |
| 7,356,427 B2 | 4/2008 | Dykstra et al. | 702/100 |
| 7,415,364 B2 * | 8/2008 | Mazrooee et al. | 702/55 |
| 7,567,856 B2 | 7/2009 | Dykstra et al. | 700/265 |
| 2006/0161358 A1 * | 7/2006 | Dykstra et al. | 702/55 |

FOREIGN PATENT DOCUMENTS

| | | |
|---|---|---|
| DE | 3326719 A1 | 1/1984 |
| EP | 582085 B1 | 2/1994 |
| EP | 1139077 | 10/2001 |

OTHER PUBLICATIONS

International Search Report and Written Opinion for PCT/GB2009/000604, dated May 28, 2009.

* cited by examiner

*Primary Examiner* — Drew A Dunn
*Assistant Examiner* — Hien X Vo
(74) *Attorney, Agent, or Firm* — John W. Wustenberg; Baker Botts LLP

(57) ABSTRACT

Improved methods and systems for estimating material weight, mass and volume in real-time are disclosed. The amount of material in the container is measured. An estimate of the amount of material in the container is then obtained using the measured amount of material in the container, a desired rate of change of material, and a container system model. The estimate of the amount of material in the container is then adjusted based on the difference between the estimated and measured amount of material in the container.

20 Claims, 4 Drawing Sheets

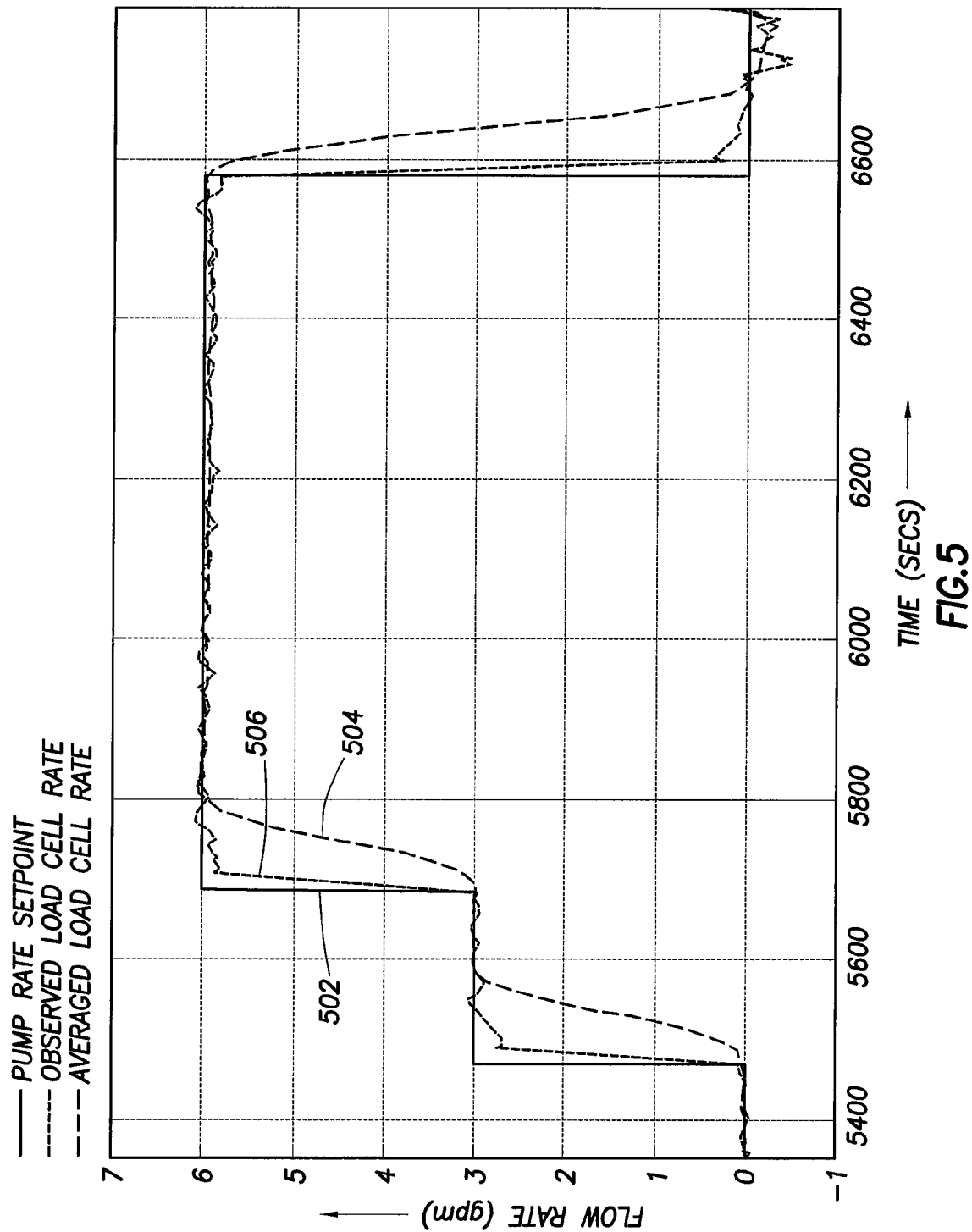

WEIGHT OBSERVER FOR MASS METERING AND INVENTORY MANAGEMENT

BACKGROUND

Fluid tanks are used in a variety of industries to store or mix fluids. For example, fluid tanks may be used in conjunction with subterranean operations to mix fluids before they are used to treat a subterranean formation. When using fluid tanks, it is often desirable to keep track of the amount of fluid contained in the tank as fluids are added and removed. Errors in measurement of fluid quantity can cause the system to become inoperative or to change its calibration over time.

Currently, various non-contact and contact methods are used to measure the fluid quantity. However, the existing methods of measuring the quantity of fluid in a mixing tank are affected by fluid characteristics. For varying types of non-contact methods, foams, vapors, fluid color, fluid density, and surface turbulence can lead to inaccuracy of sensor readings. Similarly, for contact methods, such as those involving floats, measurements are adversely affected by gumming, particle bridging, and/or friction caused by the forces acting on the float. Moreover, float systems are vulnerable to errors resulting from fouling of the electronic or electric components induced by the necessity to operate the sensing element in direct contact with the fluid in the mixing tank.

Other traditional methods of measuring the quantity or height of a fluid in a tank involve the use of a metering rod or gauge. However, such traditional methods are inherently inaccurate due to measurement inaccuracies and precision errors and have a limited achievable resolution.

Height sensors have been used as a way to overcome the drawbacks of the traditional methods of tracking the fluid levels in a tank. Height sensors may be used to obtain a direct measurement of the height or the quantity of a fluid in a mixing tank. However, such height sensor readings are often subject to the effects of the system noise as well as the noise created by the sensor itself. Moreover, the fluid tanks are often subject to movement resulting in height oscillations which can cause errors in the height sensor readings.

An improved method for estimating the height of a fluid contained in a mixing tank using a control system to minimize the resulting noise has been disclosed in U.S. patent application Ser. No. 11/029,072 (hereinafter the "'072 application"). However, a major drawback of the improved method described in the '072 application is that the tank's specific dimensions must be fed into the system to obtain an estimate of the amount of fluid in the tank, as the fluid height is dependent on the tank's shape.

Also known in the prior art are various forms of pressure sensing methods. These methods are affected by fluid density as well as internal pressure forces. As the temperature changes within the mixing tank, significant pressures can build up causing the fluid, mixing tank and measurement devices to expand if not properly restrained. However, this method has several drawbacks. First, additional structure required to prevent such expansion adds to the cost of the measurement system. Moreover, the load cell readings are time lagged and do not provide a zero-lag estimation of the amount of fluid in the tank as fluids are added to and/or removed from the tank. Hence, errors in the load cell reading and other parts of the system have an adverse impact on the estimation of the fluid amount in the tank.

Moreover, it is often desirable to track the rate at which fluids are added to or removed from a tank. Traditionally, the volumetric rate is tracked using the differentiated average volumetric rate. In order to obtain the differentiated average volumetric rate, the volume of the fluid in the tank is measured at a first time (t1) and a second time (t2). The difference between the volume at t1 and t2 is then divided by the sample period, i.e., t1-t2, providing the rate of change of fluid volume. However, this method has several drawbacks. The measured signals at t1 and t2 contain noise which may be amplified when the signals are differentiated. Therefore, the differentiated signal must be filtered by averaging the result over many samples in order to eliminate the noise. However, the filtering process adds delays to the signal. Therefore, an operator is forced to choose between a noisy signal and a delayed signal, neither of which is desirable.

SUMMARY

The present invention relates generally to fluid measurement. Specifically, the present invention is directed to improved methods and systems for estimating material weight, mass and volume in real-time.

In one embodiment, the present invention is directed to a method for estimating an amount of a material in real-time, comprising the steps of: measuring the amount of material in the container; estimating the amount of material in the container, using the measured amount of material in the container, a desired rate of change of material, and a container system model; gene rating an error signal representing the difference between the estimated amount of material and the measured amount of material; and adjusting the estimation of the amount of material in the container using the error signal.

In another embodiment, the present invention is directed to a system for estimating a nominal amount of a material in a container comprising: a dynamic control device for comparing a feedback estimated amount of the material in the container with a measured amount of the material in the container to obtain an amount error; wherein the amount error is iteratively recomputed by successive comparison of the feedback estimated amount with the measured amount to drive the feedback estimated amount to the nominal amount of the material in the container.

In yet another embodiment, the present invention is directed to a system for estimating an amount of a material in a container comprising: a first input, representing the desired rate of change of the material; a second input representing the measured amount of the material; a container system model representing the container; and a feedback loop for comparison of an estimated amount of material with the measured amount of material; wherein the estimated amount of material is obtained using the measured amount of the material and the desired rate of change of the material.

The features and advantages of the present invention will be apparent to those skilled in the art from the description of the preferred embodiments which follows when taken in conjunction with the accompanying drawings. While numerous changes may be made by those skilled in the art, such changes are within the spirit of the invention.

BRIEF DESCRIPTION OF THE DRAWINGS

These drawings illustrate certain aspects of some of the embodiments of the present invention, and should not be used to limit or define the invention.

FIG. 5 depicts a comparison of the differentiated averaged volumetric rate and the volumetric rate as estimated using a control system in accordance with an embodiment of the present invention.

DETAILED DESCRIPTION

The present invention relates generally to fluid measurement. Specifically, the present invention is directed to improved methods and systems for estimating material weight, mass and volume in real-time.

In accordance with an embodiment of the present invention, available sensors are used to provide an optimal dynamic estimation of the weight, mass or volume of a fluid contained in a mixing tank as fluid is added or removed from the tank. Accordingly, an external system observer is utilized to give a more accurate estimation of the fluid quantity in the mixing tank as fluid is added to or removed from the tank. This estimated weight of the material is compared to the measured weight to determine an estimation error. The estimation error is then used to drive the estimated weight to a nominal weight using a controller, such as a Proportional-Integral controller. The controller gains may be set to minimize any noise or oscillations from the estimation process while tracking the real-time weight of the fluids in the tank as fluids are added to or removed from the tank.

As would be appreciated by those of ordinary skill in the art, with the benefit of this disclosure, although the present invention is described in the context of tracking the weight of fluids in a mixing tank, it can be utilized to estimate any measure of an amount of a material, including the weight, mass or volume of fluids as well as solid material or a mixture of both in a variety of different application. Additionally, although the present invention is described in the context of a mixing tank, as would be appreciated by those of ordinary skill in the art, with the benefit of this disclosure, the invention may be utilized in conjunction with a bulk tank, a processing tank, or in any other applications where it would be desirable to track the amount of a material in a container.

In one embodiment, the tank is placed on a weighing apparatus such as, for example, a scale. The scale may include a transducer for real-time measurement of the weight as material is added to or removed from the tank. The load cell will convert the force incurred to an electrical signal and the rate of addition or removal of material may be determined as the load cell acquires data.

Figure 1:
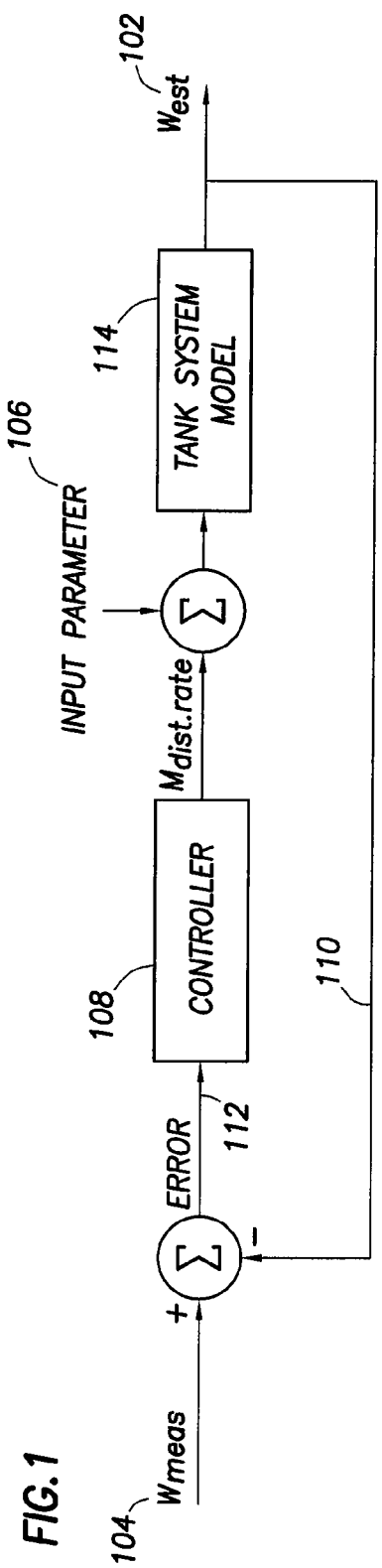
FIG. 1 illustrates an overview of a block diagram of a system for estimating the amount of material in a container.

Consider a system defined as a single tank with limited known dimensional data. Referring now to the drawings wherein like reference numerals refer to the same or similar elements, FIG. 1 is a block diagram which illustrates that an estimated weight 102 ($W_{est}$) of the fluid in a tank may be obtained by processing the value of a measured weight 104 ($W_{meas}$) with one or more input parameters 106 of the tank system through a tank system model 114. The tank system model 114 is a model which represents the dynamic changes in mass and weight of material as the material is being withdrawn or input into the tank over time. As would be appreciated by those of ordinary skill in the art, the tank system model 114 may more generally be referred to as a container system model as it may represent any container system in which the amount of material added or removed is to be tracked. Specifically, a sensor such as a transducer may be used to determine the measured weight 104. The difference between the measured weight 104 and the estimated weight 102 of the fluid in the tank may be determined as an error signal which may be summed with the input parameter 106 to generate a signal corresponding to the estimated mass rate change of a fluid in the tank. This signal is then processed using a tank system model 114 to generate a signal corresponding to the estimated weight 102 of the fluid in the tank. As would be appreciated by one of ordinary skill in the art, with the benefit of this disclosure, the input parameter 106 may be a commanded, desired or set point mass rate or volumetric rate of a fluid into or out of the tank. The error signal resulting from the difference between the estimated weight 102 of fluid in the tank and measured weight 104 may be caused by a number of factors, including, but not limited to, sensor inaccuracies or discrepancies between the desired rate of input/output and the actual rate of system input/output. Therefore, the closed feed back loop depicted in FIG. 1 may drive the estimated weight 102 of fluid in the tank closer and closer to the real-time, steady state fluid weight and compensate for the system's non-ideal performance while eradicating noise and oscillations. Stated otherwise, a dynamic control device 108 is used in conjunction with a tank system model 114 to estimate the nominal weight of the material in the tank by comparing a feedback estimated weight 110 of the material in the tank with a measured weight 104 to obtain an error amount 112. Thereafter, the error amount 112 is iteratively recomputed by successive comparisons of the feedback estimated weight 110 and the measured weight 104. Through successive iterations, the dynamic control device 108 will drive the estimated weight 102 of the fluid in the tank to the nominal weight of the fluid. The observer depicted in FIG. 1 may be based on a control system which may include one or more input parameters 106. As would be appreciated by those of ordinary skill in the art, with the benefit of this disclosure, the input parameters 106 may be feed forward parameters.

Figure 2:
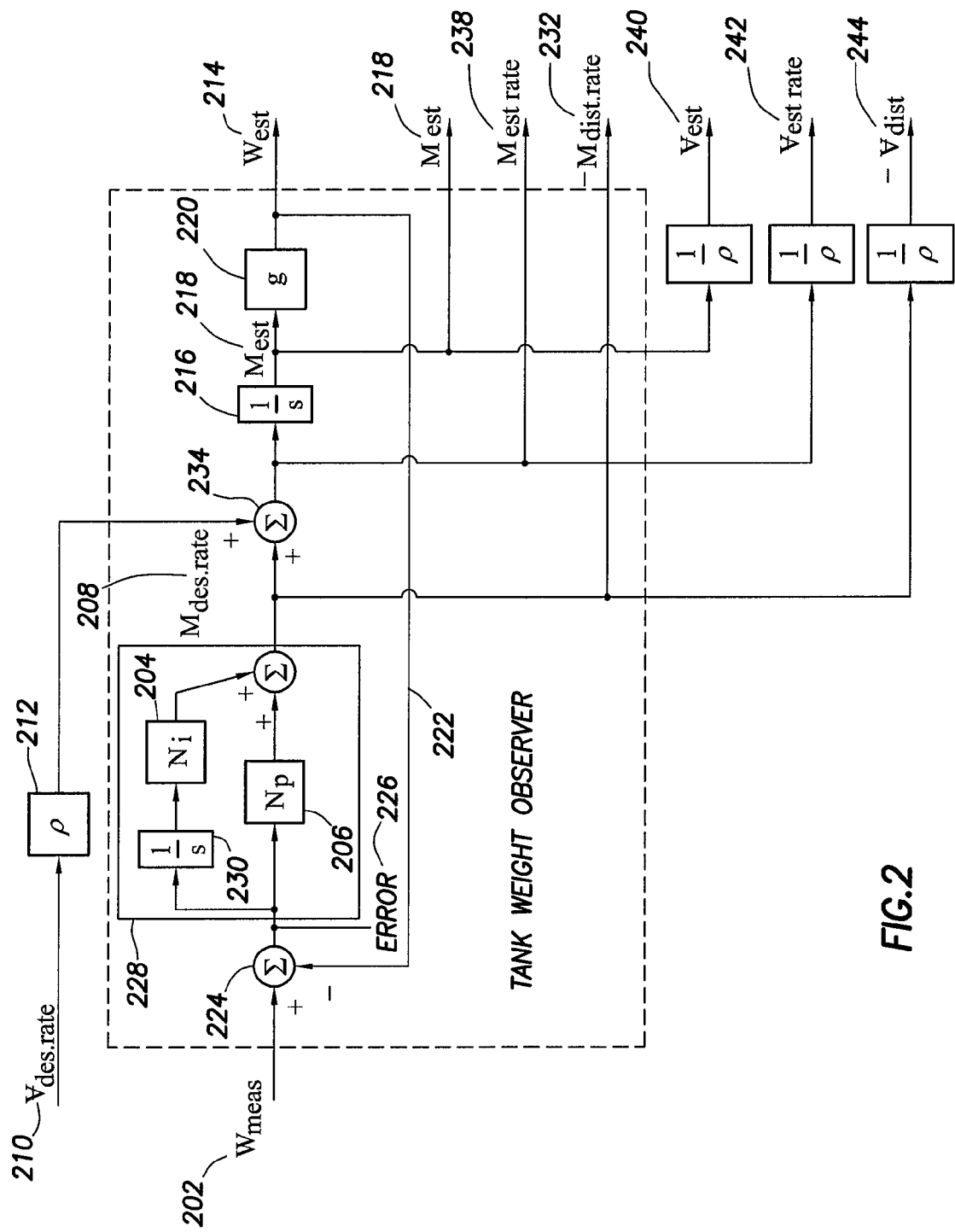
FIG. 2 illustrates a schematic embodiment of a system for estimating the amount of material in a container.

A more detailed depiction of a system in accordance with an embodiment of the present invention is provided in FIG. 2. As described above, a scale may be used to determine the weight of the fluid in the tank denoted as measured weight 202 ($W_{meas}$). The measured weight 202 may be the first input to the system. The second system input may be the desired input/output parameter which may be fed into the system as a desired mass rate input/output 208 ($M_{des\ rate}$). As would be appreciated by those of ordinary skill in the art, the desired input or output rate may also be fed in as a volumetric rate 210 ($V_{des\ rate}$), which can in turn be converted to a mass rate using the density 212 ($\rho$), of the material being added to or removed from the tank. One of ordinary skill in the art will appreciate that any number of other input/output parameters may also or alternatively be used. In one exemplary embodiment, the desired input or output rate may be the rate at which a pump is directed to pump fluid to or from the mixing tank.

The estimated weight 214 ($W_{est}$) of the fluid in the mixing tank may then be determined, based on the measured weight 202 and the desired input/output mass rate 208 or volumetric rate 210. Block 216 may represent an integration process with respect to time, converting a rate of change of mass 238 ($M_{est\ rate}$) of the fluid in the tank to an estimated mass 218 ($M_{est}$) of the fluid in the tank. The estimated mass 218 may then be multiplied by a gravitational force 220 (g) to obtain an estimated weight 214 of the fluid in the tank.

Due to sensor inaccuracies, noise and other system imperfections the system may include a feedback loop 222. The value of the estimated weight 214 may be fed into a summation block 224 which may generate an error signal 226 representing the discrepancy between the measured weight 202 and estimated weight 214 of the tank. The error signal 226 may be fed into a controller 228, such as a Proportional-Integral (PI) Controller. The controller 228 may have a Laplace transformation block 230, an integral gain 204 ($N_i$), and a proportional gain 206 ($N_p$). The output of the controller 228 may be a mass disturbance rate 232 ($M_{dist\ rate}$). This mass disturbance rate 232 may be directed to a summation block 234 and summed with a desired mass input/output rate 208. The disturbance mass rate 232 from the controller 228 may adjust the desired mass input/output rate 208 to drive the estimated weight 214 to equal the measured weight 202. Therefore, the feedback loop 222 may be used to drive the estimated rate of change of the mass 238 of the fluid in the tank closer to the actual rate of change of the mass of the fluid in the tank. Consequently, the closed loop control system of the present invention can provide an estimated weight 214 of the fluid in the tank which may be equal to the measured weight 202 of the fluid in the tank. However, the signal representing the estimated weight 214 may have a zero lag and may be noise free, therefore providing an accurate and almost instantaneous representation of the amount of fluid in the tank at any given time.

As would be appreciated by those of ordinary skill in the art, with the benefit of this disclosure, output signals may be obtained from various points in the closed loop system to provide information regarding system performance. For instance, the user may obtain information regarding the estimated mass 218 of the fluid in the tank, the estimated rate of change of mass 238 in the tank or the mass disturbance rate 232. Moreover, the mass and the volume of the fluid in the tank are related through the equation:

$$V = M/\rho$$

Therefore, a conversion process between mass/mass rate and volume/volumetric rate may be implemented using the material density. Such conversions may or may not be necessary, depending on what signals are available or required for a particular application. Utilizing the conversion process, a system operator can also obtain information regarding an estimated volume 240 (Vest), estimated volumetric rate 242 (Vest rate) or the volumetric disturbance rate 244. This information can be used by a system operator in several ways. In one embodiment, the mass disturbance rate 232 or the volumetric disturbance rate 244 (Vdist rate) may be monitored for diagnostic information related to delivery performance. For instance, a mass disturbance rate 232 which suddenly spikes to a relatively large value would indicate either a delivery problem (such as a pump breaking or control system issues where the set point of the pump and the pump response does not coordinate) or would indicate a load cell error (such as the load cell faulting or the scale getting mechanically "hung up"). Moreover, if the mass disturbance rate were to grow relatively slowly, it would indicate either a load cell calibration problem or a pump which was losing pumping efficiency. Consequently, in one exemplary embodiment, the mass disturbance rate 232 may be used to alert an operator about system problems, including, but not limited to, sensor calibration errors, sensor failures, or delivery problems into or out of the container resulting from a pump malfunction. Moreover, as would be appreciated by those of ordinary skill in the art, with the benefit of this disclosure, the same monitoring and diagnostic methods may be used utilizing the volumetric disturbance rate 244 information.

In one embodiment (not shown) the control system of the present invention may be provided by a software application. A data acquisition software may be used to obtain the inputs representing the measured weight 202 of the fluid in the tank and the desired mass input/output rate 208 of the fluid in the tank. The software may then operate to generate the estimated weight 214 and other desired output values. However, when using software, the accuracy of the output parameters will be restricted by the software data acquisition rate.

Figure 3:
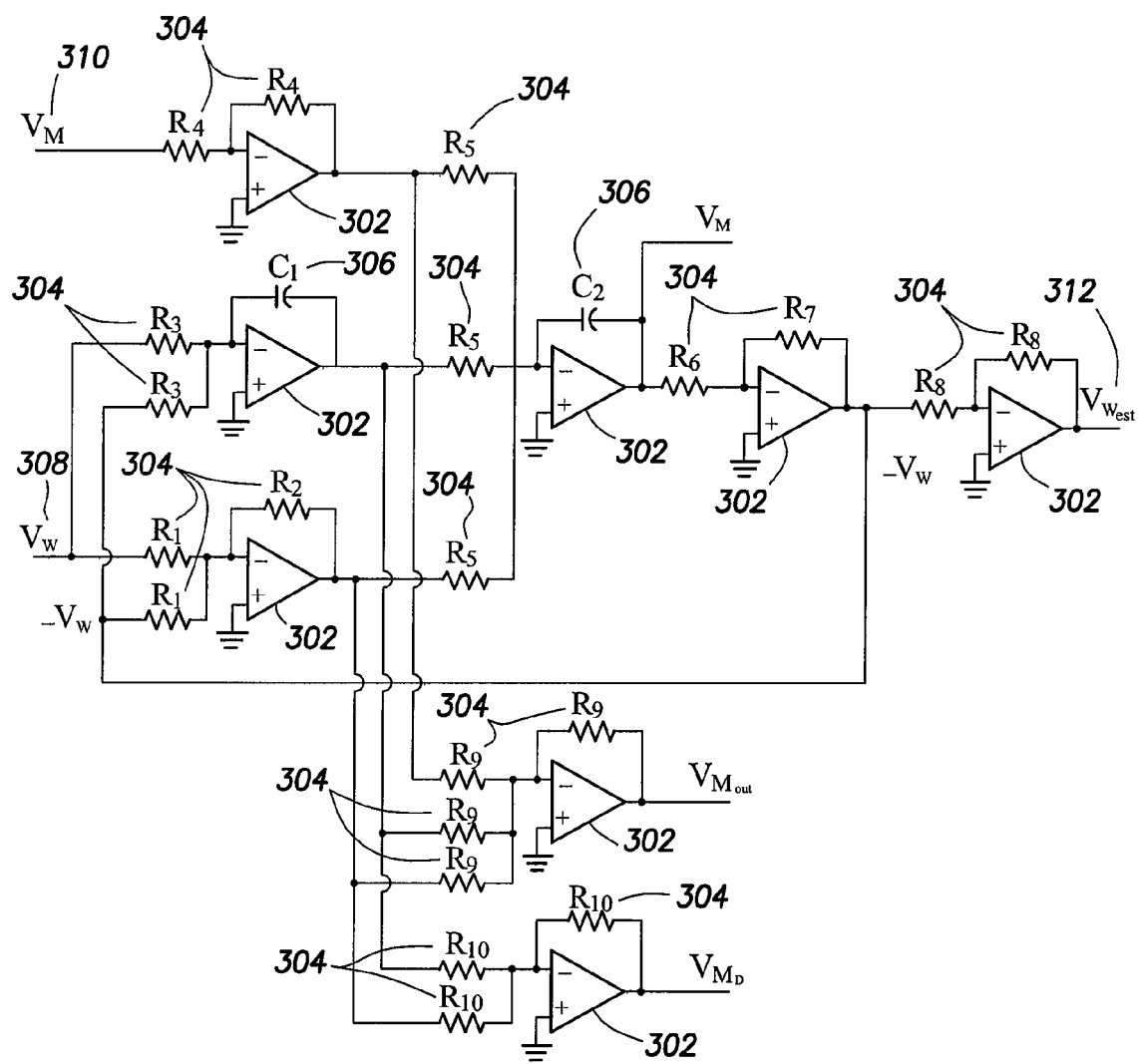
FIG. 3 depicts a hardware structure for carrying out a control system in accordance with an embodiment of the present invention.

Depicted in FIG. 3 is a hardware structure for carrying out the control system in accordance with an embodiment of the present invention. A number of Operational Amplifiers (Op-Amps) 302, resistors 304 and capacitors 306 may be used to operate as the control system described above with the voltages representing the value of the system parameters. As would be appreciated by those of ordinary skill in the art, in the circuit diagram depicted in FIG. 3, the resistors having like numeral subscripts have the same resistance value. Voltages are used to represent the system's inputs and outputs. Specifically, $V_W$ 308 and $V_M$ 310 may represent the system inputs and $V_{West}$ 312 may represent a voltage representing the estimated weight of the fluid in the tank. The components of the electric circuit may operate almost instantaneously. Therefore, the system time delays may be almost non-existent when using the electric circuit to implement the present invention. Moreover, unlike the software implementation, the operation of the electric circuit is not limited by a sampling rate as the data is continuously acquired.

Thus, a weight observer in accordance with an embodiment of the present invention may produce a real-time, zero-lag and noise free signal corresponding to the current estimated mass 218 ($M_{est}$), estimated weight 214 ($W_{est}$) or estimated volume 240 ($V_{est}$) as well as the current mass 238, weight (not shown) or volume 242 input or output rate which is independent of the tank's shape or dimensions. The obtained estimates may have a minimal noise level as they may be filtered by the controller 228. Moreover, due to the combination of the filtered Proportional-Integral error signal and the open loop model using the commanded mass rate, the estimates may be zero lag signals.

To facilitate a better understanding of the present invention, the following examples of certain aspects of some embodiments are given. In no way should the following examples be read to limit, or define, the scope of the invention.

EXAMPLES

Figure 4:
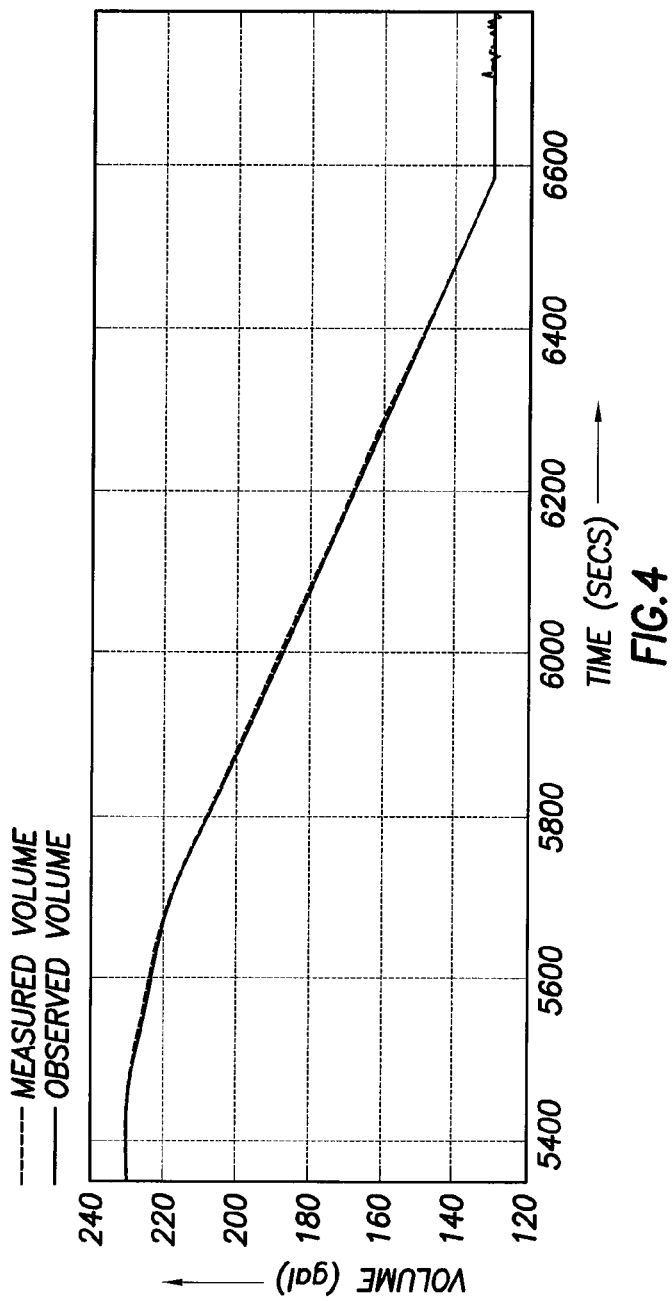
FIG. 4 depicts a comparison of the actual volume of material in a container and the volume of material as estimated using a control system in accordance with an embodiment of the present invention.

FIG. 4 depicts a comparison of the actual real-time measurement of the amount of fluid in a tank and the amount of fluid in the tank as estimated using the method in accordance with an embodiment of the present invention. In this example all the mass/mass rate quantities were converted to volume/volumetric rate quantities using the estimated fluid density. The algorithm outlined above was then performed at a frequency of 1 Hz and data was collected. FIG. 4 depicts the portion of data collected as the volume of the fluid in the tank was reduced from approximately 230 gallons to 130 gallons over the course of about 23 minutes. As shown in FIG. 4, the Observed Volume is initially nearly identical to the Measure Volume and provides some filtering characteristics towards the end of the time period.

Shown in FIG. 5 is a comparison of the pump rate set point 502 or desired volumetric rate corresponding to $V_{des\ rate}$, the differentiated average volumetric rate 504, and the estimated volumetric rate 506 corresponding to Vest rate obtained from a weight observer in accordance with an embodiment of the present invention over a period of about 23 minutes. The differentiated average volumetric rate 504 is the current industry standard for calculating a rate based on acquired volumetric data. As depicted in FIG. 5, the signal 506 corresponding to the observed load cell rate has filtered characteristics similar to the averaged signal 504 with the additional benefit of no delay or lag due to the filtering process. Therefore, from a measurement and control stand-point, the estimated volumetric rate 506 as determined by the weight observer is a more desirable signal than the differentiated average volumetric rate 504 in that it has a faster response time while still providing a filtered signal. As a result, a pump controller using this improved signal could respond to changes in flow rate much faster improving the performance of a flow rate control process.

Therefore, the present invention is well-adapted to carry out the objects and attain the ends and advantages mentioned as well as those which are inherent therein. While the invention has been depicted and described by reference to exemplary embodiments of the invention, such a reference does not imply a limitation on the invention, and no such limitation is to be inferred. The invention is capable of considerable modification, alternation, and equivalents in form and function, as will occur to those ordinarily skilled in the pertinent arts and having the benefit of this disclosure. The depicted and described embodiments of the invention are exemplary only, and are not exhaustive of the scope of the invention. Consequently, the invention is intended to be limited only by the spirit and scope of the appended claims, giving full cognizance to equivalents in all respects. The terms in the claims have their plain, ordinary meaning unless otherwise explicitly and clearly defined by the patentee.

What is claimed is:

1. A method for estimating an amount of a material in a container in real-time using a weight observer, comprising the steps of:
    measuring the amount of material in the container at a first point in time;
    estimating the amount of material in the container at a second point in time using the weight observer,
        wherein the weight observer comprises a dynamic control device and a container system model;
    wherein the weight observer uses the measured amount of material in the container at the first point in time, a desired rate of change of material, and the container system model to estimate the amount of material in the container at the second point in time;
    wherein the weight observer generates an error signal representing the difference between the estimated amount of material and the measured amount of material; and
    wherein the dynamic control device adjusts the estimated amount of material in the container using the error signal;
    wherein adjusting the estimation of the amount of material in the container using the error signal comprises:
    determining a disturbance signal representing the difference between the desired rate of change of material and an actual rate of change of material;
    using the disturbance signal and the desired rate of change of material to determine an estimation of the actual rate of change of material; and
    using the estimation of the actual rate of change of material and the container system model to estimate the amount of material in the container.

2. The method of claim 1, wherein the amount of material is a mass, a volume or a weight of the material.

3. The method of claim 1, wherein the weight observer estimates the rate of change of the amount of material in the container.

4. The method of claim 1, wherein the weight observer passes the error signal through a controller.

5. The method of claim 4, wherein the controller is a Proportional-Integral controller responsive to the error signal.

6. The method of claim 5, wherein gains of the Proportional-Integral controller are set to obtain an optimal tracking of the amount of the material.

7. The method of claim 1, wherein the container is selected from the group consisting of a bulk tank, a mixing tank, and a processing tank.

8. The method of claim 1, wherein the desired rate of change of material comprises one of a rate at which material is pumped out of the container and a rate at which material is pumped into the container.

9. The method of claim 1, further comprising the steps of:
    analyzing the disturbance signal; and
    diagnosing a problem associated with a system component based on the analysis of the disturbance signal.

10. The method of claim 9, wherein the system component is a load cell, a pump, a scale, or a control system.

11. A system for estimating a nominal amount of a material in a container comprising:
    a dynamic control device for comparing a feedback estimated amount of the material in the container with a measured amount of the material in the container to obtain an amount error;
    wherein the amount error is iteratively recomputed by successive comparison of the feedback estimated amount with the measured amount to drive the feedback estimated amount to the nominal amount of the material in the container;
    wherein the feedback estimated amount is obtained using the measured amount, a desired rate of change of the amount, and a container system model;
    wherein the dynamic control device adjusts the feedback estimated amount of material in the container using the amount error;
    wherein adjusting the feedback estimated amount of material in the container using the amount error comprises:
    determining a disturbance signal representing the difference between the desired rate of change of material and an actual rate of change of material;
    using the disturbance signal and the desired rate of change of material to determine an estimation of the actual rate of change of material; and
    using the estimation of the actual rate of change of material and the container system model to adjust the feedback estimated amount of material in the container.

12. The system of claim 11, wherein the amount of the material in the container is the weight, the mass or the volume of the material in the container.

13. The system of claim 11, wherein the dynamic control device comprises a controller.

14. The system of claim 13, wherein the controller is a Proportional-Integral controller.

15. The system of claim 11, wherein the container is selected from the group consisting of a bulk tank, a mixing tank, and a processing tank.

16. A system for estimating an amount of a material in a container comprising:
    a first input, representing the desired rate of change of the material;
    a second input, representing the measured amount of the material;
    a container system model representing the container; and a feedback loop for comparison of an estimated amount of material with the measured amount of material;

wherein difference between the estimated amount of material and the measured amount of material is an error signal;

wherein the estimated amount of material is obtained using the measured amount of the material and the desired rate of change of the material;

wherein obtaining the estimated amount of material comprises:

determining a disturbance signal representing the difference between the desired rate of change of the material and an actual rate of change of material;

using the disturbance signal and the desired rate of change of the material to determine an estimation of the actual rate of change of material; and using the estimation of the actual rate of change of material and the container system model to obtain an estimated amount of material in the container.

17. The system of claim 16, wherein the desired rate of change of the material is a volumetric rate of change.

18. The system of claim 16, wherein the estimated amount of material is a mass of the material, a volume of the material or a weight of the material.

19. The system of claim 16, wherein a difference between the estimated amount of material and the measured amount of material is used to drive the first input closer to an actual rate of change of material.

20. The system of claim 16, wherein the container is selected from the group consisting of a bulk tank, a mixing tank, and a processing tank.

* * * * *